United States Patent [19]

Turley, Jr. et al.

[11] Patent Number: 5,539,625
[45] Date of Patent: Jul. 23, 1996

[54] VEHICLE HEADLAMP AIMING DEVICE

[75] Inventors: Richard E. Turley, Jr., Anderson; Michael E. O'Shaughnessey, Fort Wayne; William E. Nagengast, Anderson; Steven V. Horsman, Indianapolis, all of Ind.

[73] Assignee: General Motors Corporation, Detroit, Mich.

[21] Appl. No.: 521,766

[22] Filed: Aug. 31, 1995

[51] Int. Cl.⁶ ................................................. B60Q 1/06
[52] U.S. Cl. ........................... 362/66; 362/69; 362/423
[58] Field of Search ................................. 362/66, 69, 70, 362/423, 424

[56] References Cited

U.S. PATENT DOCUMENTS

| | | | |
|---|---|---|---|
| 4,689,725 | 8/1987 | Saijo et al. | 362/66 |
| 5,023,759 | 6/1991 | Eckenrode | 362/66 |
| 5,063,480 | 11/1991 | McMahan et al. | 362/61 |
| 5,065,293 | 11/1991 | Mochizuki | 362/273 |
| 5,067,056 | 11/1991 | Suzuki et al. | 362/66 |
| 5,068,769 | 11/1991 | Umeda et al. | 362/61 |
| 5,077,642 | 12/1991 | Lisak | 362/66 |
| 5,091,829 | 2/1992 | Hendrischk et al. | 362/61 |
| 5,138,533 | 8/1992 | Daumueller | 362/66 |
| 5,138,542 | 8/1992 | Daumueller et al. | 362/420 |
| 5,140,503 | 8/1992 | Lisak | 362/61 |
| 5,150,958 | 9/1992 | Miyazawa et al. | 362/66 |
| 5,186,531 | 2/1993 | Ryder et al. | 362/66 |
| 5,186,532 | 2/1993 | Ryder et al. | 362/66 |
| 5,193,905 | 3/1993 | Edwards et al. | 362/425 |
| 5,197,794 | 3/1993 | Scott et al. | 362/66 |
| 5,197,799 | 3/1993 | Dehaene | 362/420 |
| 5,343,372 | 8/1994 | Shirai et al. | 362/66 |
| 5,365,415 | 11/1994 | Schmitt et al. | 362/66 |

*Primary Examiner*—Carroll B. Dority
*Attorney, Agent, or Firm*—Ernest E. Helms

[57] ABSTRACT

A vehicle headlamp adjuster for aiming a headlamp unit is provided including a housing for connection with a generally fixed portion of the vehicle, the housing having first and second ends; a drive screw mounted by and projecting through the housing, the drive screw having a first end for connection with the headlamp unit and a second end extending from the second end of the housing; a drive train mounted by the housing to translate the drive screw to adjust the headlamp unit; a transparent end cap connected to the second end of the housing and encircling the second end of the drive screw; and a slider having a first end slidably mounted on the housing and a second end slidably mounted on the end cap. The slider is translationally frictionally held in position and is adjacent to the second end having indication markings to determine the position of the drive screw.

4 Claims, 3 Drawing Sheets

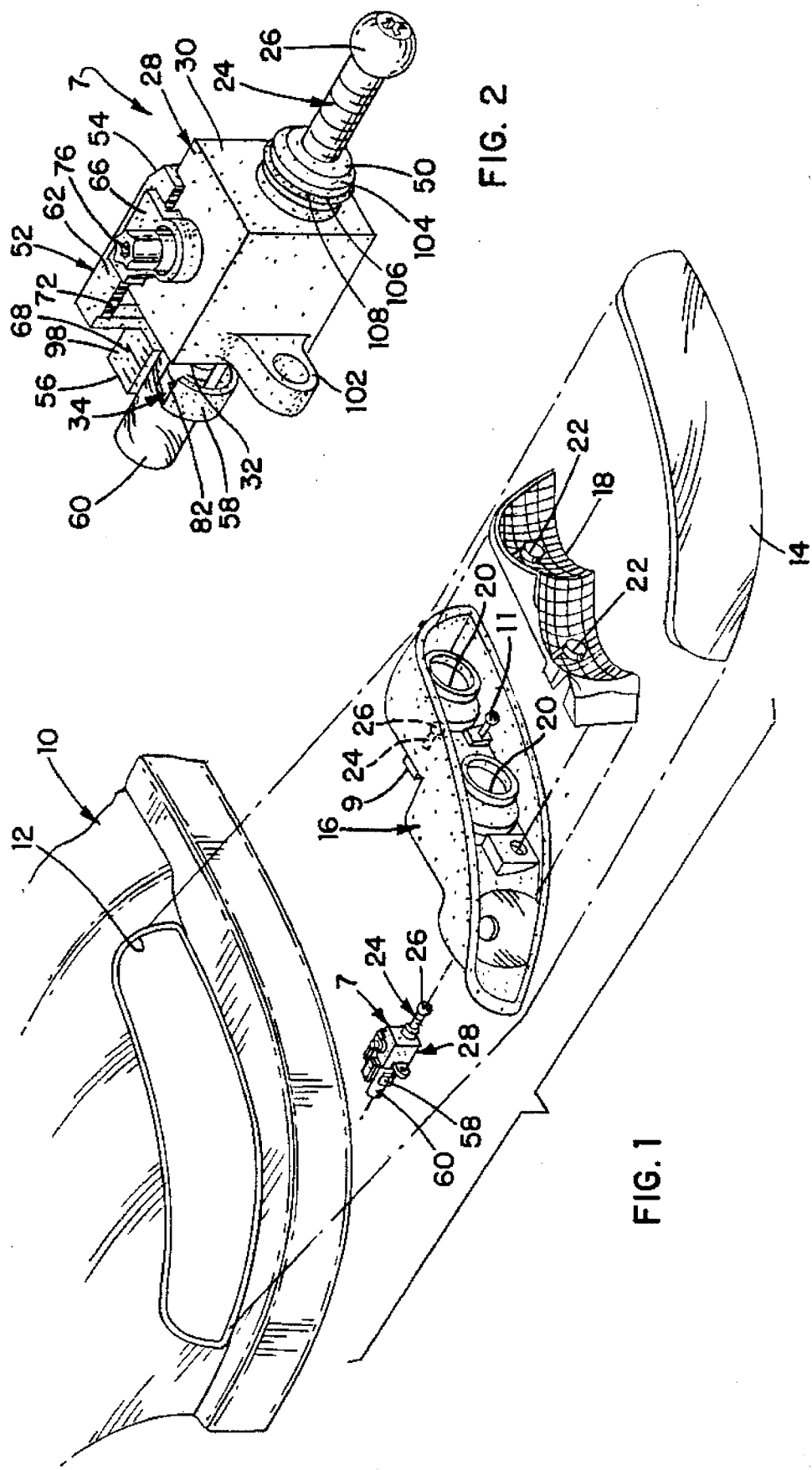

VEHICLE HEADLAMP AIMING DEVICE

FIELD OF THE INVENTION

The field of the present invention is that of vehicle headlamp adjusters.

BACKGROUND OF THE INVENTION

Vehicle headlamps with aerodynamic styling provide for replaceable halogen bulbs. This permits a lens and reflector to remain in place on the vehicle and only requires that a small halogen bulb be replaced should a bulb burn out and require servicing. Replaceable headlamps are optically aimed (at the production facility) with an aimer that registers on three aim "tips" that are molded onto the front surface of each headlamp lens. The aimer device is separate from the headlamps and attaches with a suction cup to the three aim "tips" on the headlamp lens surface. These three tips establish a plane that permits the headlamp to be aimed mechanically, without the headlamp bulb even being lighted.

A production facility aimer has contained within it a level bubble (a curved sealed glass vial filled with mineral spirits and an air bubble) that is used to aim the headlamp vertically. Other production facility aimer features permit horizontal aiming. The aimer is set up so that its internal level bubble is parallel to the axis of the high beam parabola and also parallel to the light emitted from the headlamp. As the headlamp is adjusted with the vertical adjustment assembly, the level bubble in the aimer moves until it is in a position that shows that the lamp is in aim (in the middle of the spirit bubble vial).

Recently, changes in headlamps have affected the three aim tips used for the above-described aimer. Changes in headlamp size have reduced the vertical size of the lens surface to the extent that in some cases there is no room for aim tips or special adapters for the aimers. For these vehicle headlamps, a new aiming device is required. Secondly, the use of "reflector optics" with a clear lens has created a headlamp lens without aim tips. Styling has dictated that the lens be clear so that the tinted reflector surfaces (reflector optics) can be seen. The aforementioned vehicle headlamps also require a new aiming device. Thirdly, headlamps now can have an independently adjustable reflector within an external housing and lens (commonly referred to as an internally adjustable reflector headlamp). Internally adjustable headlamps generally have reflector optics and a clear lens and also require a new type of aiming device.

For the aforementioned new categories of vehicle headlamps, the federal government has required that there be some means of establishing the vertical and horizontal aim of a headlamp after vehicle assembly. Level bubbles are generally used for vertical aiming. Special vehicle headlamp adjusters are used for horizontal aiming.

SUMMARY OF THE INVENTION

The present invention provides a headlamp adjuster which also allows a calibration indicating method to show where the "factory-aim" position of the headlamp is set at the assembly facility. Thus, if the headlamp horizontal aim should change due to vehicle operation or maintenance on the vehicle, the headlamp may be easily re-aimed back to its end-aim position which was initially established at the vehicle assembly facility. Other such adjustment devices have been provided by U.S. Pat. Nos. 5,065,293 and 5,068,769. The present invention provides an alternative to the aforementioned patents.

BRIEF DESCRIPTION OF THE DRAWINGS

FIG. 1 is an exploded view of the from quarter of an automotive vehicle illustrating the environment of the present invention.

FIG. 2 is an enlarged perspective view of the adjuster shown in FIG. 1.

DESCRIPTION OF THE PREFERRED EMBODIMENT

Figure 3:
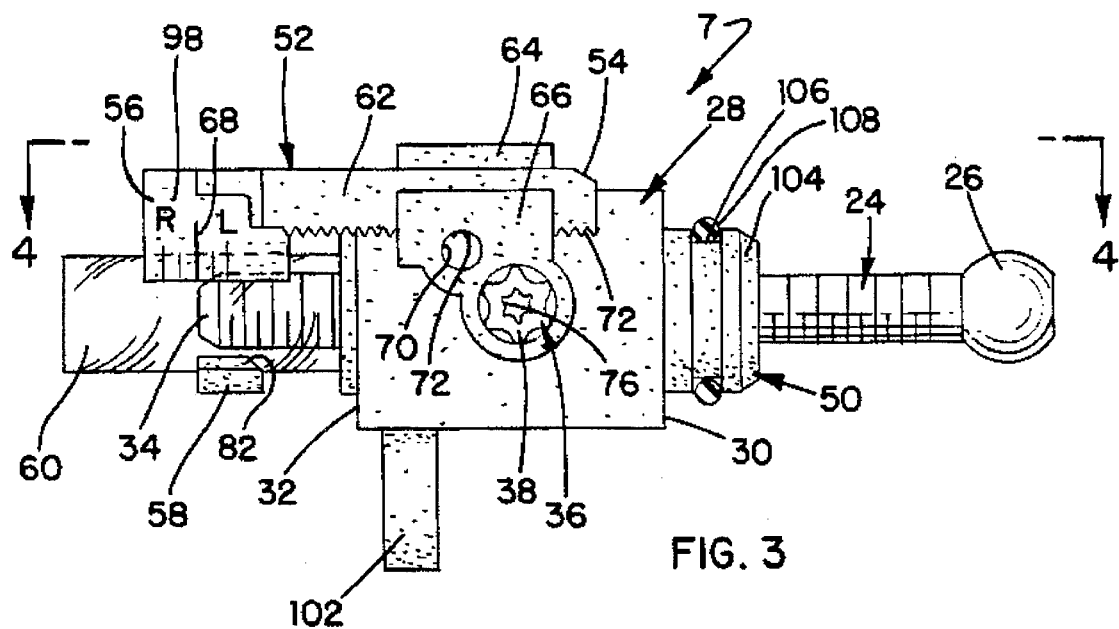
FIG. 3 is a top plan view of the adjuster shown in FIG. 1.
Figure 4:
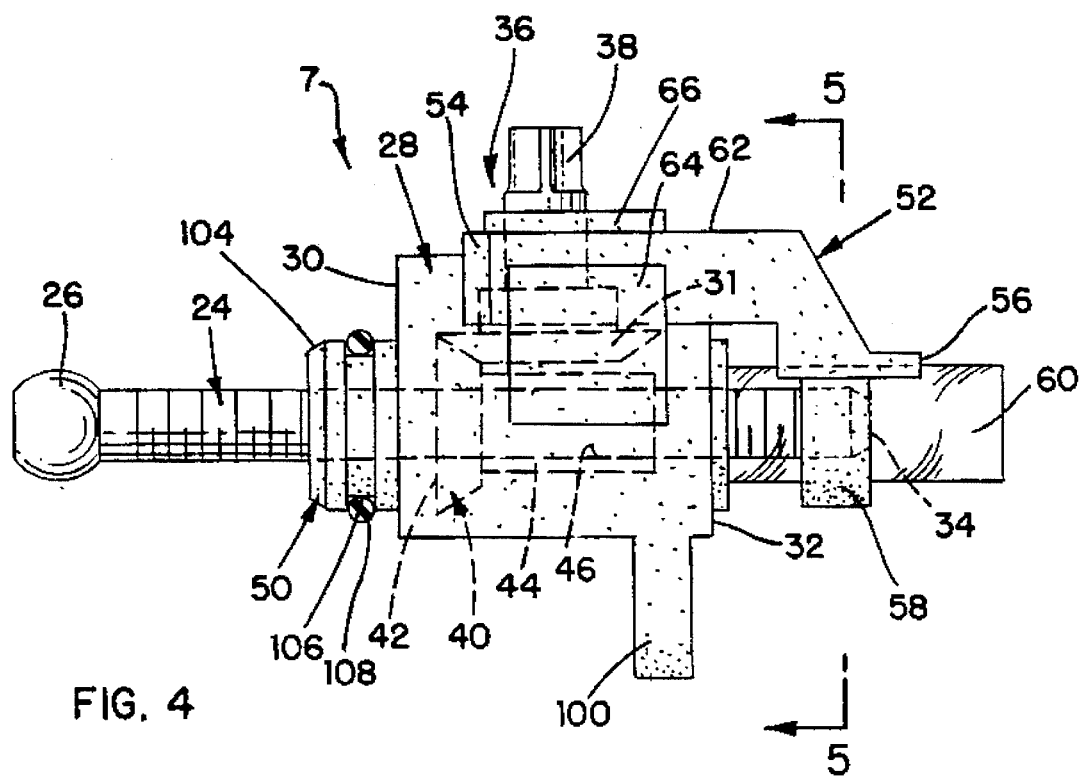
FIG. 4 is a view taken along line 4—4 of FIG. 3.

Referring to FIG. 1, an automotive vehicle 10 from quarter has a headlamp opening 12 which is sealed by a lens 14. Mounted within the opening 12 is a mounting panel 16 which is generally fixed within the vehicle. Between the lens 14 and the mounting panel 16, there is a generally sealed space. Within the sealed space is a reflector housing 18. Reflector housing 18 is mounted in a spaced relationship from the panel 16 by a tripod arrangement by adjusters 7 and 9 which have adjustable length rods or adjustment screws extending therefrom and a generally fixed screw 11. To allow the lens 14 to be clear, the reflector surfaces of the reflector housing 18 typically will incorporate the needed optics to allow the headlamp to meet requirements in regard to glare. The housing 16 has two generally large apertures 20 which allow for installation and replacement of an illuminating bulb (not shown) which also extends through apertures 22 of the reflector housing. To achieve the proper aim of the headlamp, the adjusters 7 and 9 will extend or retract their respective adjustment or drive screws 24. The drive screws 24 have a balled end 26 to allow pivotal connection with the reflector housing 18. It should be noted that in the type of headlamp arrangement shown in FIG. 1, typically the housing 16 does not move with the reflector assembly and, as is well known to those familiar with the art, the lens 14 is also stationary.

Referring to FIGS. 2–5, the adjuster 7 has a main body 28 with a first front end 30 and a second rear end 32. Typically for cost reasons, the body 28 will be fabricated from an opaque polymeric plastic material. Extending through the housing 28 and mounted thereby is the drive screw 24 having the ball 26 toward its first end. Extending from the housing 28 is the second end 34 of the drive screw.

To translate the drive screw in and out with respect to the housing 28, there is a drive train 36 which includes an input shaft 38 which is fixably connected to a first gear 31 which in turn meshes with a second gear 40. Second gear 40 has a head portion 42 integrally connected to a sleeve 44. Both the head and sleeve portions are threadably engaged with the drive screw 24 along an inner bore 46. To ensure translation of the drive screw 24 there is also provided (not shown) some type of mechanism to prevent the drive screw 24 from rotating. The antirotational aspect of the present invention can be achieved along a flat milled upon the drive screw 24 (not shown) which interfaces with a flat provided in the guide portion extension 50 which is integrally connected to the housing 28 or by interface between the ball 26 and the housing 18 or still other methods.

An indicator piece or slider 52 is provided having a first end 54 and a second end 56. The slider 52 is held on the gear drive housing 28 with a flexible grip ring 58 around a clear transparent plastic cylindrical end cap 60. The slider 52 also is kept in an engaged position with the gear drive housing 28 by an L-shaped cross-sectional horizontal projection 62 of the slider 52 that is held between a flexible vertical sidewall 64 and a top retainer 66 on the housing 28. The housing 28 is molded from plastic such as nylon, acetal or other suitable material. The slider 52 remains in this pre-aim or pre-calibrated position (shown in FIG. 3) where the "zero" indicator 68 lines up with the second end 34 of the drive screw until the headlamp is aimed. After headlamp aiming, the drive screw 24 position can change. If the drive screw 24 position does change as a result of headlamp aiming, then the second end 34 of the drive screw 24 does not line up with the "zero" marking 68. The slider 52 then needs to be recalibrated to remedy this situation (i.e., returned to a position that shows that the screw end 34 and the "zero" marking 68 are again in alignment as shown in FIG. 3 and will indicate that the headlamp is in-aim horizontally).

Recalibration is done by insertion of a star head screwdriver or similar device (not shown) into an opening 70 to thereby engage the star head screwdriver teeth with the exposed teeth 72 that are part of a series of teeth 72 in the slider 52. Rotation of the star head screwdriver will move the slider 52 fore or aft, depending on the rotation of the star head screwdriver. To re-establish calibration, the slider 52 is moved until the "zero" marking 68 again aligns with the end 34 of the adjustment screw.

Thereafter, if the drive shaft 38 is turned during headlamp horizontal aim adjustment, or if the headlamp moves out of the assembly line in-aim position due to vehicle vibration during driving or an accident, one can tell how far from in-aim the headlamp has moved.

In the event that the headlamp changes position, one can see how far from factory aim the headlamp has moved by comparing the "zero" indicator 68 with the second end 34 of the drive screw 24. If the "zero" point 68 and the second end 34 of the adjustment screw align, then the headlamp is in-aim horizontally. If not, one can rotate the drive shaft 38 [either externally or with a star head screw driver (not shown) that can engage in opening 76] to thereby move the adjustment screw end 34 until the screw end 34 and "zero" marking 68 align so as to re-establish the assembly plant horizontal aim of the headlamp.

Figure 5:
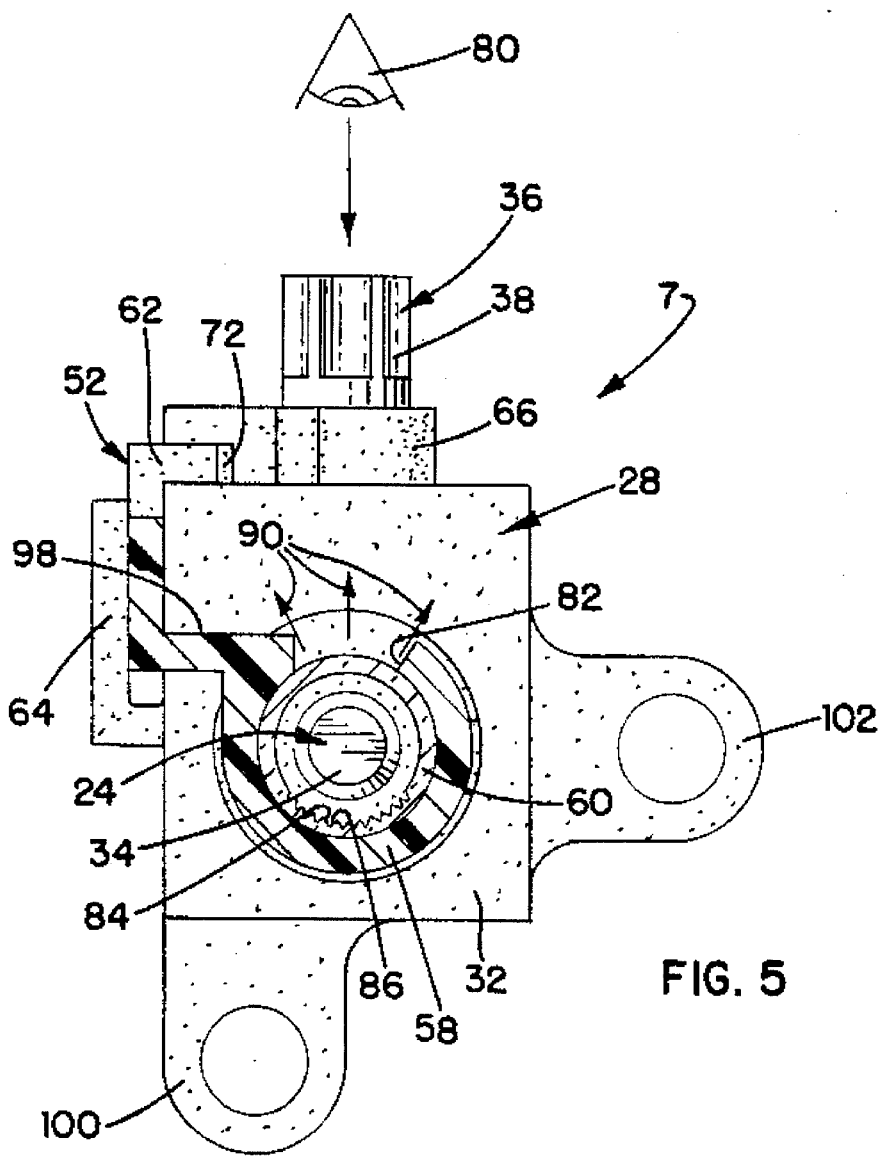
FIG. 5 is an enlarged rear elevational view of the adjuster shown in FIGS. 3 and 4, taken along line 5—5 of FIG. 4.
Figure 6:
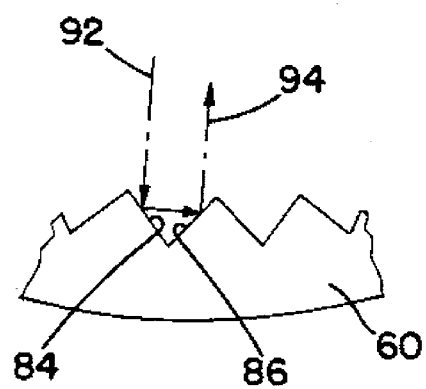
FIG. 6 is a schematic enlargement of a portion of the adjuster shown in FIG. 3.

Should the clear plastic cylindrical end cap 60 be over a black surface, it may be a challenge to see the second end 34 of the drive screw 24. In this case, a special surface may be used that creates a reflectivity of the light from above to create a white background behind the adjustment screw second end 34. In this option, it is assumed that an eye is positioned at 80 above the adjuster 7 looking down on an opening 82 of the ring 58. Should one wish to determine whether the second end 34 of the drive screw aligns with the "zero" marking 68 and should the background behind the clear cylindrical end cap 60 (opposite to the viewing eye 80) be dark in color, a light ray 92 can be reflected by light directing surfaces formed on the inside lower surfaces 84, 86 of the cylindrical projection (FIG. 5). These surfaces 84 and 86 are located at the inside of the cylindrical projection and permit rays of light 90, 92 and 94 to be reflected upwardly through the end cap 60 so as to form a reflective lenslet, improving visibility of the second end 34 of the drive screw relative to the "zero" marking 68. The inside lower surfaces 84, 86 of the end cap 60 form a plurality of V-shaped grooves such that any viewing angle for the eye 80 through opening 82 has a V-shaped groove in alignment with it on the lower surface of the end cap 60 behind the drive screw second end 34. These formed V-shaped grooves extend the entire length of the end cap 60 along axes parallel to the sidewalls of the end cap 60.

The "zero" marking 68 is located on a surface 98 adjacent to opening 82 to facilitate determination of proper aim through comparison to drive screw second end 34. There are other markings on surface to indicate movement left or right of the headlamp (horizontally).

The gear drive housing 28 is mounted with two mounting tabs 100 and 102 that have holes through them for attaching screws.

The gear drive housing cylindrical projection 50 is beveled at 104 and has a groove 106 that serves to retain an O-ring 108. When the gear drive housing 28 is attached to the headlamp, the O-ring 108 serves to prevent moisture intrusion into the headlamp.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A vehicle headlamp adjuster for aiming a headlamp unit, the adjuster comprising:

a housing for connection with a generally fixed portion of the vehicle, the housing having a first end and a second end;

a drive screw mounted by and projecting through the housing, the drive screw having a first end for connection with the headlamp unit and a second end extending from the second end of the housing;

a drive train mounted by the housing to translate the drive screw to adjust the headlamp unit;

a transparent end cap connected to the second end of the housing and encircling the second end of the drive screw; and a slider, the slider having a first end slidably mounted on the housing and a second end slidably mounted on the end cap, the slider being translationally frictionally held in position, the slider adjacent to the second end having indication markings to determine the position of the drive screw.

2. An adjuster as described in claim 1 wherein the slider has a series of teeth and wherein the slider may be translated by engagement of the teeth with a rotating torque device passing through an alignment passage of the housing which is adjacent the teeth of the slider.

3. An adjuster as described in claim 1 wherein the housing is generally opaque and the end cap is fabricated from a translucent polymeric material.

4. An adjuster as described in claim 1 wherein the end cap at its bottom end has reflective lenslet to make the second end of the drive screw more readily visible.

\* \* \* \* \*